United States Patent
Kanbe et al.

(10) Patent No.: US 8,270,286 B2
(45) Date of Patent: Sep. 18, 2012

(54) THERMALLY ASSISTED MAGNETIC RECORDING MEDIUM AND MAGNETIC RECORDING STORAGE

(75) Inventors: Tetsuya Kanbe, Ichihara (JP); Atsushi Hashimoto, Ichihara (JP); Takayuki Fukushima, Ichihara (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/073,408

(22) Filed: Mar. 28, 2011

(65) Prior Publication Data

US 2011/0235479 A1    Sep. 29, 2011

(30) Foreign Application Priority Data

Mar. 29, 2010    (JP) .................... 2010-075271

(51) Int. Cl.
  *G11B 3/70*    (2006.01)

(52) U.S. Cl. ............... 369/288; 428/832; 428/828.1

(58) Field of Classification Search ............ 369/280, 369/283, 286, 288, 13.32; 428/836.2, 800, 428/826, 836, 831, 828.1, 832; 204/192.2, 204/192.1
See application file for complete search history.

(56) References Cited

U.S. PATENT DOCUMENTS

| | | | |
|---|---|---|---|
| 6,068,739 A | 5/2000 | Suzuki et al. | |
| 7,431,999 B2 * | 10/2008 | Iwasaki et al. | 428/831 |
| 7,601,445 B2 * | 10/2009 | Iwasaki et al. | 428/836.2 |

FOREIGN PATENT DOCUMENTS

JP    11-353648 A    12/1999

OTHER PUBLICATIONS

Xu et al., "In situ ordering of fePt thin films with face-centered-tetragonal (001) texture on $Cr_{100-x}Ru_x$ underlayer at low substrate temperature", Applied Physics Letters, May 6, 2002, vol. 80, No. 18.
Shen et al., "In situ epitaxial growth of ordered FePt (001) films with ultra small and uniform grain size using a RuAl underlayer", Journal of Applied Physics, 2005, vol. 97, 10H301.

* cited by examiner

*Primary Examiner* — Ali Neyzari
(74) *Attorney, Agent, or Firm* — Sughrue Mion, PLLC

(57) ABSTRACT

Disclosed is a thermally assisted magnetic recording medium comprising a substrate, a plurality of underlayers formed on the substrate, and a magnetic layer which is formed on the underlayers and predominantly comprised of an alloy having an $L1_0$ structure, characterized in that at least one of said underlayers is predominantly comprised of MgO and comprises at least one kind of an element having a free energy for oxidation of, per mol of oxygen, not higher than −120 kcal/mol·$O_2$ at 1000° C. The element having the free energy for oxidation is preferably selected from Al, Si, Ti, V, Cr, Mn, Zr and B. The thermally assisted magnetic recording medium has a magnetic layer comprised of magnetic crystal grains with uniform diameters, and exhibiting a sufficiently weak exchange coupling between magnetic grains.

9 Claims, 3 Drawing Sheets

THERMALLY ASSISTED MAGNETIC RECORDING MEDIUM AND MAGNETIC RECORDING STORAGE

TECHNICAL FIELD

This invention is concerned with a thermally assisted magnetic recording medium, and a magnetic recording storage provided with the thermally assisted magnetic recording medium.

BACKGROUND OF THE INVENTION

In thermally assisted magnetic recording wherein a magnetic recording medium is irradiated with an evanescent light whereby the surface of the medium is locally heated and the coercive force of the medium is decreased, and writing is effected. This thermally assisted magnetic recording attracts attention as a magnetic recording system of the next generation which is capable of realizing a high plane recording density of approximately 1 T bit/inch$^2$ or larger. In the case when the thermally assisted magnetic recording system is adopted, even when a recording medium having a coercive force of several tens kOe (note, 10 Oe equals to approximately 79 A/m) at room temperature is used, writing can easily be effected with a magnetic head having the currently available magnetic recording field.

Therefore a magnetic material exhibiting a high magneto crystalline anisotropy Ku of higher than approximately $10^6$ J/m$^3$ can be adopted for the recording layer. Thus, average particle diameter of magnetic crystal grains can be reduced to 6 nm or smaller while a high thermal stability is maintained. As such high Ku material, there can be mentioned, for example, a FePt alloy with an $L1_0$ type crystalline structure having a Ku of approximately $7\times10^6$ J/m$^3$ and a CoPt alloy having a Ku of approximately $5\times10^6$ J/m$^3$.

In the case when a FePt alloy with an $L1_0$ type crystalline structure is used for the magnetic layer, the FePt alloy crystal grains should preferably be (001)-ordered. The orientation of the FePt alloy crystal grains in a magnetic layer can be controlled by a layer formed underneath the magnetic layer. For example, it is described in Japanese unexamined patent publication H11-353648 that an FePt magnetic layer is (001)-ordered in the case when the FePt magnetic layer is formed above a (100)-ordered MgO underlayer with an intervening Cr underlayer.

It is described in Appl. Phys. Lett. 80, 3325 (2002) that a FePt magnetic layer is (001)-ordered in the case when the magnetic layer is formed on a (100)-ordered CrRu alloy underlayer. Further, it is described in J. Appl. Phys. 97, 10H301 (2005) that an FePt magnetic layer is (001)-ordered in the case when the FePt magnetic layer is formed above a RuAl underlayer having a B2 structure with an intervening Pt underlayer.

The magnetic layer of a thermally assisted magnetic recording medium is preferably comprised of, for example, an FePt alloy with an $L1_0$ structure having a high Ku value. To reduce the media noise of the thermally assisted magnetic recording medium, magnetic crystal grains in the magnetic layer should preferably be rendered fine. However, when an exchange coupling between magnetic grains is strong, adjacent magnetic grains are bonded together to form a large magnetic cluster resulting in enhancement of the media noise. Therefore, to reduce the media noise, the exchange coupling between magnetic grains must be weakened to minimize the formation of clusters having a large size, simultaneously with the reduction in size of magnetic crystal grains.

To minimize the formation of clusters having a large size, a grain boundary segregation material such as an oxide including SiO$_2$, or carbon is preferably added into the magnetic layer to separate the magnetic crystal grains. However, when a limited amount of a grain boundary segregation material is added, the width of grain boundaries tend to decrease with a decrease in grain size. The decrease of the width of grain boundaries shortens the distance between adjacent magnetic grains, and consequently, locally strongly exchange-coupled grain pairs or grain groups often occur with the result of formation of magnetic clusters having a large size.

If a large amount of a grain boundary segregation material is added, the formation of magnetic clusters having a large size can be minimized, but, the addition of an excessive amount of a grain boundary segregation material tends to reduce the regularity of magnetic crystal grains having an $L1_0$ structure. Therefore, it is eagerly desired to effectively prevent the formation of magnetic clusters having a large size without addition of an excessive amount of a grain boundary segregation material.

BRIEF SUMMARY OF THE INVENTION

In view of the foregoing background art, a primary object of the present invention is to provide a thermally assisted magnetic recording medium characterized as having the magnetic layer comprised of magnetic crystal grains with uniform diameters, and exhibiting a sufficiently weak exchange coupling between magnetic grains.

Another object of the present invention is to provide a magnetic recording storage which is provided with a thermally assisted magnetic recording medium having the above-mentioned benefits, and exhibits a high SN ratio and good overwriting characteristics.

In accordance with the present invention, there are provided the following thermally assisted magnetic recording mediums.

(1) A thermally assisted magnetic recording medium comprising a substrate, a plurality of underlayers formed on the substrate, and a magnetic layer which is formed on the underlayers and predominantly comprised of an alloy having an $L1_0$ structure, characterized in that at least one of said underlayers is predominantly comprised of MgO and comprises at least one kind of an element having a free energy for oxidation of, per mol of oxygen, not higher than −120 kcal/mol·O$_2$ at 1000° C.

(2) The thermally assisted magnetic recording medium as described above in (1), wherein the element having a free energy for oxidation of, per mol of oxygen, not higher than −120 kcal/mol·O$_2$ at 1000° C. is at least one element selected from the group consisting of Al, Si, Ti, V, Cr, Mn, Zr and B.

(3) The thermally assisted magnetic recording medium as described above in (1), wherein the content of the element having a free energy for oxidation of, per mol of oxygen, not higher than −120 kcal/mol·O$_2$ at 1000° C. is in the range of 2 atomic % to 40 atomic %, based on the underlayer predominantly comprised of MgO.

(4) The thermally assisted magnetic recording medium as described above in (1), wherein the underlayer predominantly comprised of MgO is formed on an underlayer which is comprised of Cr, or a Cr alloy predominantly comprised of Cr and having a BCC structure.

(5) The thermally assisted magnetic recording medium as described above in (1), wherein the underlayer predominantly comprised of MgO is formed on an underlayer which is comprised of Ta.

(6) The thermally assisted magnetic recording medium as described above in (1), wherein the underlayer predominantly comprised of MgO has an average particle diameter of smaller than 10 nm.

(7) The thermally assisted magnetic recording medium as described above in (1), wherein the magnetic layer is predominantly comprised of an FePt or CoPt alloy having an $L1_0$ structure, and comprises at least one oxide or element, selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO and carbon.

(8) The thermally assisted magnetic recording medium as described above in (1), which further comprises a cap layer, formed on the magnetic layer, which is comprised of an alloy having a magneto crystalline anisotropy lower than that of the alloy having an $L1_0$ structure in the magnetic layer.

In accordance with the present invention, there is further provided the following magnetic recording storage.

(9) An improved magnetic recording storage comprising, in combination:
(i) a magnetic recording medium;
(ii) a driving part for rotating the magnetic recording medium;
(iii) a magnetic head comprising a recording head part and a reproducing head part; said recording head part having a laser emitting means for heating the magnetic recording medium, a waveguide for guiding laser from the laser-emitting means to a tip of the recording head part, and an evanescent light-emitting means provided at the tip of the recording head part;
(iv) means for moving the magnetic head to the magnetic recording medium; and
(v) a recording-and-reproducing signal treating means for inputting signal to the magnetic head and for reproducing output signal from the magnetic head;
wherein the improvement lies in that the magnetic recording medium is a thermally assisted magnetic recording medium as described above in (1).

DETAILED DESCRIPTION OF THE INVENTION

Figure 1:
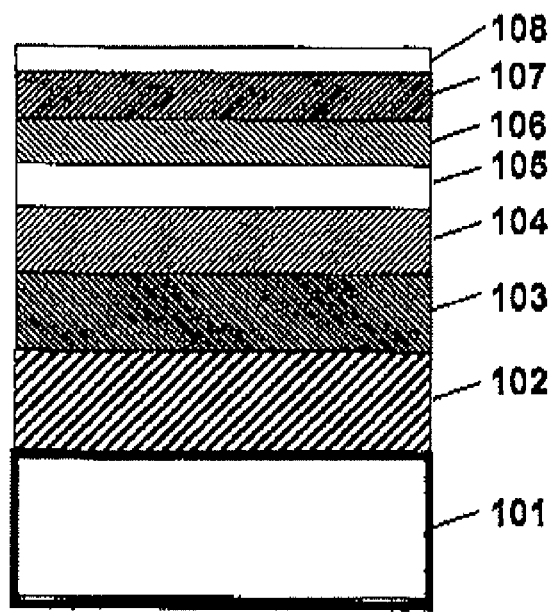
FIG. 1 is an enlarged sectional view illustrating an example of the multilayer structure of the thermally assisted magnetic recording medium of the invention.

The thermally assisted magnetic recording medium according to the present invention comprises a substrate, a plurality of underlayers formed on the substrate, and a magnetic layer which is formed on the underlayers and predominantly comprised of an alloy having an $L1_0$ structure, and characterized in that at least one of said underlayers is predominantly comprised of MgO and comprises at least one kind of an element having a free energy for oxidation of, per mol of oxygen, not higher than $-120$ kcal/mol·$O_2$ at 1000° C.

As described above, an FePt alloy and other magnetic alloys having an $L1_0$ structure and a high Ku (magnetic anisotropy constant) value are preferably used for the magnetic layer of a heat assisted magnetic recording medium. Further the FePt alloy is preferably (001)-ordered for exhibiting an enhanced magnetic anisotropy in the direction perpendicular to the substrate plane.

The (001) orientation of the FePt alloy in the magnetic layer can be effected by forming a magnetic layer of the FePt alloy on an underlayer predominantly comprised of (100)-ordered MgO (the layer predominantly comprised of MgO is hereinafter referred to as "MgO-containing layer" when appropriate). The (100)-ordered MgO-containing layer can be formed by a procedure wherein a second underlayer consisting of Ta or predominantly comprised of Ta is formed on a glass substrate, and a MgO-containing layer is formed on the Ta-containing second layer. The (100)-ordered MgO-containing layer can also be formed by another procedure wherein a second underlayer comprised of Cr or predominantly comprised of a Cr alloy having a BCC structure is formed on a glass substrate, and a MgO-containing layer is formed on the Cr-containing second layer. The Cr- or Cr alloy-containing second underlayer is also (100)-ordered.

The MgO-containing underlayer is preferably comprised of crystal grains having an average particle diameter of smaller than approximately 10 nm. If the MgO-containing underlayer is comprised of crystal grains having an average particle diameter of at least approximately 10 nm, two or more magnetic crystal grains grow on one grain of MgO crystal tend to be magnetically bonded together to form magnetic clusters having a large size. In contrast, when the MgO-containing underlayer is comprised of crystal grains having an average particle diameter of not larger than approximately 10 nm, one magnetic crystal grain grows on approximately one grain of MgO crystal. In this case, adjacent magnetic crystal grains grow on MgO crystal grains different from each other, and thus, broad grain boundaries are formed in the magnetic layer. Consequently the exchange coupling between magnetic grains can be sufficiently reduced whereby the size of magnetic clusters is reduced. This mode of growth wherein one magnetic crystal grain grows on one crystal grain of underlayer is called "one-by-one growth".

When the one-by-one growth occurs to a considerable extent in the magnetic crystal grains, the cluster size can be reduced and simultaneously the size of magnetic crystal grains can be rendered uniform. The one-by-one growth can be promoted by rendering fine the crystal particle diameter in the MgO-containing underlayer.

The crystal particle diameter in the MgO-containing underlayer can be reduced to the desired extent by adding in the MgO-containing underlayer at least one kind of an element having a free energy for oxidation of, per mol of oxygen, not higher than $-120$ kcal/mol·$O_2$ at 1000° C.

As specific examples of the element having a free energy for oxidation of, per mol of oxygen, not higher than $-120$ kcal/mol·$O_2$ at 1000° C., there can be mentioned Al, Si, Ti, V, Cr, Mn, Zr and B. These elements may be used either alone or as a combination of at least two thereof.

The particles in the MgO-containing underlayer preferably have an average particle diameter of not larger than approximately 10 nm. When the particles in the MgO-containing underlayer have such a small particle diameter, discretion of the magnetic crystal grains can be advantageously effected. However, to realize a plane recording density of approximately 1 Tbit/inch$^2$ or more, the average particle diameter of the magnetic crystal grains should be approximately 6 nm or smaller. For these small particle diameters of the magnetic crystal grains, the average particle diameter in the MgO-containing underlayer should also preferably be approximately 6 nm or smaller.

The amount of the element having the above-specified free energy for oxidation to be contained in the MgO-containing underlayer is not particularly limited provided that the NaCl structure of the MgO-containing underlayer and the (100) orientation thereof are not deteriorated to any appreciable extent. The amount of said element is usually in the range of approximately 2 atomic % to approximately 40 atomic %. When the amount of said element is smaller than approximately 2 atomic %, the MgO crystal grains are not rendered fine to the desired extent. When the amount of said element is larger than approximately 40 atomic %, the NaCl structure of the MgO-containing underlayer is deteriorated to a considerable extent.

The magnetic layer is preferably comprised of an alloy such as FePt alloy or CoPt alloy, which has an $L1_0$ structure.

As specific examples of the grain boundary segregation material to be incorporated in the magnetic layer, there can be mentioned at least one oxide or element, selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO and carbon. These oxides and carbon may be used either alone or in combination.

The amount of oxides as the grain boundary segregation material to be incorporated in the magnetic layer is preferably in the range of approximately 10% by mol to approximately 40% by mol, based on the sum of the oxide and MgO. The amount of carbon as the grain boundary segregation material is preferably in the range of approximately 10 atomic % to approximately 70 atomic %, based on the sum of carbon and MgO.

A cap layer can be formed on the magnetic layer. By the formation of a cap layer, writing characteristics are improved. Preferably, the cap layer is predominantly comprised of at least one of Fe, Ni and Co, and contains a material having a magneto crystalline anisotropy smaller than that of the FePt or CoPt alloy having an $L1_0$ structure.

In addition to the above-mentioned orientation-controlling layers, a heat sink layer can be formed from a metal or an alloy material, which has a high thermal conductivity. The metal includes, for example, Cu, Ag and Al, and the alloy includes, for example, those which are predominantly comprised of Cu, Ag or Al.

To further enhance the writing characteristics, a soft magnetic underlayer can be formed. The material for the soft magnetic layer includes, for example, Co or an alloy predominantly comprised of Co or Fe, such as CoFeTaZr, CoFeTaSi, CoFeZrSi, FeTaC, FeAlSi and NiFe.

If desired, an adhesive layer can be provided on the substrate for enhancing the adhesion to the substrate.

Figure 2:
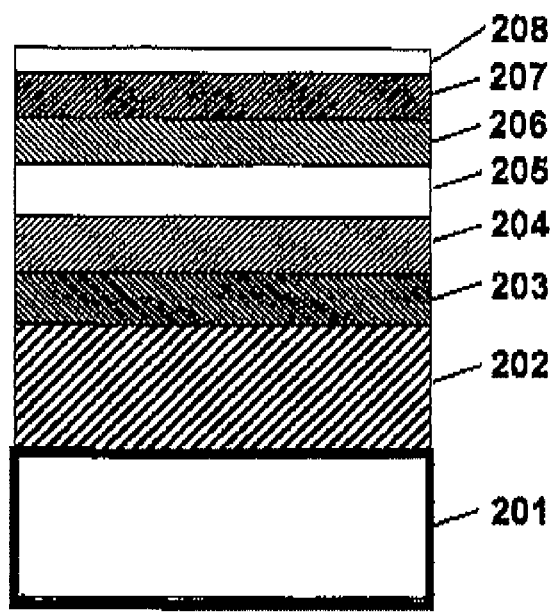
FIG. 2 is an enlarged sectional view illustrating another example of the multilayer structure of the thermally assisted magnetic recording medium of the invention.

An example of the multilayer structure of the thermally assisted magnetic recording medium of the present invention is illustrated in FIG. 1 and another example thereof is illustrated in FIG. 2.

In the magnetic recording medium illustrated in FIG. 1, a CoTi alloy underlayer (102), a FeAlSi soft magnetic underlayer (103), a CrV underlayer (104), an underlayer (105) predominantly comprised of MgO, a magnetic layer (106), a cap layer (107) and a carbon protective overcoat (108) are formed in this order on a glass substrate (101).

In the magnetic recording medium illustrated in FIG. 2, a Ag heat-sink layer (202), a soft magnetic underlayer (203), Ta underlayer (204), a MgO-containing underlayer (205), a magnetic layer (206), a cap layer (207) and a carbon protective overcoat (208) are formed in this order on a glass substrate (201).

Figure 3:
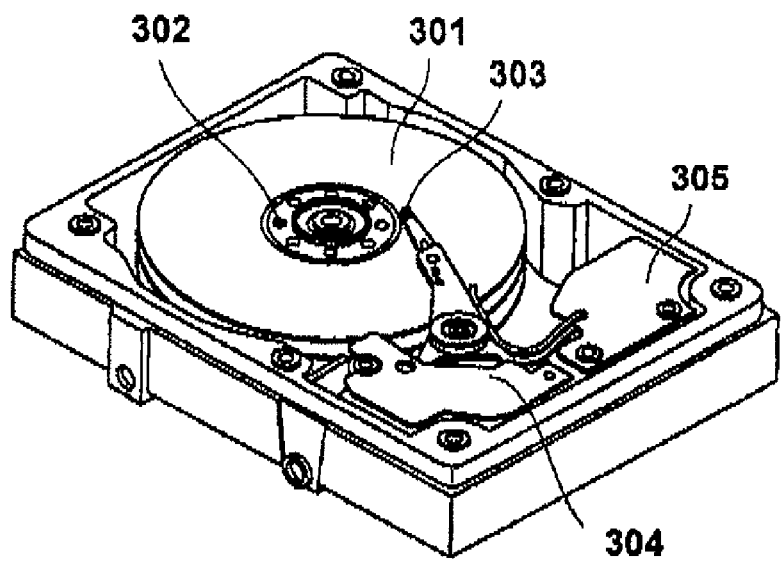
FIG. 3 is a perspective illustration showing an example of the magnetic recording storage of the invention.

An example of the magnetic recording storage of the present invention is illustrated in FIG. 3. The magnetic recording storage of the present invention comprises, in combination, a magnetic recording medium (301); a driving part (302) for rotating the magnetic recording medium; a magnetic head (303); means (304) for moving the magnetic head to the magnetic recording medium; and a recording-and-reproducing signal treating means (305) for inputting signal to the magnetic head and for reproducing output signal from the magnetic head.

Figure 4:
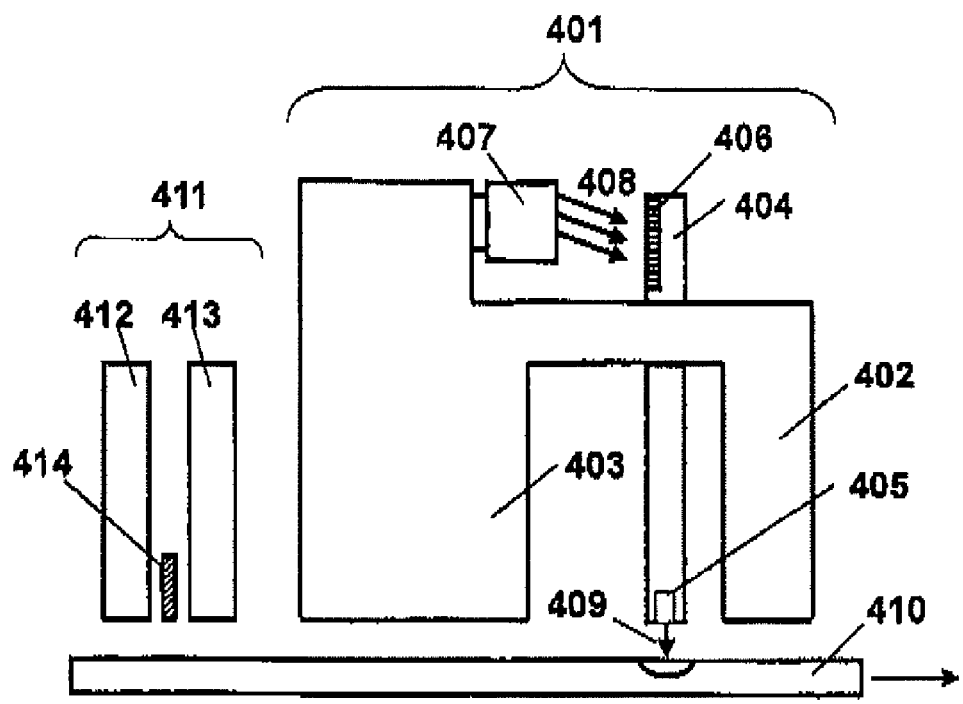
FIG. 4 is an enlarged view of a magnetic head provided in the magnetic recording storage of the invention.

The structure of the magnetic head (303) is illustrated in FIG. 4.

The magnetic recording storage of the present invention is characterized in that the magnetic recording medium (FIG. 3, 301) is the above-described thermally assisted magnetic recording medium.

FIG. 4 is an enlarged view of the magnetic head (303) provided in the magnetic recording storage of the invention. The magnetic head comprises a recording head part (401) and a reproducing head part (411). The recording head part (401) has a laser emitting means (407) for heating the magnetic recording medium, a PSIM (planar solid immersion mirror) (404) which form a waveguide for guiding laser (408) from the laser-emitting means (407) to a tip of the recording head part (401), and an evanescent light-emitting means (405) provided at the tip of the recording head part (401).

More specifically, the recording head part (401) has an upper pole (402), a lower pole (403), and a PSIM (planar solid immersion mirror) (404) sandwiched between the upper pole (402) and the lower pole (403). The PSIM (404) can be constituted as described in, for example, Jpn., J. Appl. Phys., vol. 45, No. 2B, pp 1314-1320 (2006). The PSIM (404) has an evanescent light-emitting means (405) provided at a tip of the PSIM (404). The PSIM (404) constitute a waveguide for guiding laser from the laser-emitting means (407) to the evanescent light-emitting means (405). The PSIM has a grating part (406) which is irradiated with semi-conductor laser (408) having a wavelength of, for example, 650 nm emitted from the laser-emitting means (407). The laser is concentrated to the evanescent light-emitting means (405), and the emitted evanescent light (409) heats the thermally assisted magnetic recording medium (410).

The reproducing head part (411) of the magnetic head has a upper shield (412), a lower shield (413), and a TMR element (414) sandwiched between the upper shield (412) and the lower shield (413).

In the above-mentioned magnetic head, the PSIM for heating (404) and the evanescent light-emitting means (405) provided at a tip thereof are disposed on the leading side of the main pole of magnetic head. Alternatively the PSIM (404) and the evanescent light-emitting means (405) can be disposed on the trailing side of the main pole of magnetic head.

EXAMPLES

The thermally assisted magnetic recording medium and the magnetic recording storage according to the present invention will now be specifically described by the following examples.

Examples 1-1 to 1-8, and Comparative Example 1

Thermally assisted magnetic recording media having a multilayer structure as illustrated in FIG. 1 were manufactured as follows.

A Co-50 atomic % Ti alloy underlayer (102) having a thickness of 30 nm and an Fe-20 atomic % Al-5 atomic % Si alloy soft magnetic underlayer (103) having a thickness of 25 nm were formed in turn on a glass substrate (101). Then the two underlayers-formed substrate was heated to 250° C., and a Cr-20 atomic % V alloy underlayer (104) having a thickness of 10 nm was formed thereon. Then a MgO-containing underlayer (105) having a thickness of 5 nm was formed, and then the substrate was heated to 420° C. Thereafter, (Fe-55 atomic % Pt)-14 mol % $TiO_2$ magnetic layer (106) having a thickness of 6 nm, Co-10 atomic % Ta-5 atomic % B cap layer (107) having a thickness of 2 nm and then a diamond-like carbon (DLC) protective overcoat (108) having a thickness of 3 nm were formed in this order.

As the MgO-containing underlayer (105), each of the following compositions: MgO-12 atomic % Al, MgO-8 atomic % Si, MgO-20 atomic % Ti, MgO-15 atomic % V, MgO-6 atomic % Cr, MgO-9 atomic % Mn, MgO-16 atomic % Zr, and MgO-9 atomic % B were used, respectively, in Examples 1-1 to 1-8. For comparison, an MgO underlayer to which an element having the prescribed free energy for oxidation had not been added was used in Comparative Example 1.

Each of the magnetic recording mediums manufactured in Examples 1-1 to 1-8 and Comparative Example 1 was analyzed by X-ray diffractometry. A strong BCC (200) diffraction peak attributed to the CrV underlayer was observed. Further, a mixed peak of strong $L1_0$-FePt (002) peak with FCC-FePt (200) peak was observed. Integral intensity ratio of the former $L1_0$-FePt (001) peak to the latter mixed peak of $L1_0$-FePt (002) and FCC-FePt (200) was in the range of 1.6 to 1.8. This shows that $L1_0$ type FePt alloy crystal having a high regularity was formed.

To determine the particle diameters in the MgO-containing underlayer, multilayer structures for test were manufactured by the same procedures as those mentioned above except that the magnetic layer and the cap layer were not formed in each of the multilayer structures for test with all other procedures and conditions remaining the same. Average particle diameters of crystal grains in the MgO-containing underlayers were measured by observation of TEM images of the MgO-containing underlayers. All of the average particle diameters of crystal grains in the MgO-containing underlayers of MgO-12 atomic % Al, MgO-8 atomic % Si, MgO-20 atomic % Ti, MgO-15 atomic % V, MgO-6 atomic % Cr, MgO-9 atomic % Mn, MgO-16 atomic % Zr, and MgO-9 atomic % B in Examples 1-1 to 1-8, respectively, were smaller than 10 nm. In contrast, the average particle diameter of crystal grains in the MgO-containing underlayer in Comparative Example 1 was larger than 30 nm.

An average particle diameter <D> of magnetic crystal grains of the magnetic layer in each of the magnetic recording mediums in Examples 1-1 to 1-8 and Comparative Example 1, a standard deviation thereof normalized by the average particle diameter, σ/<D>, and a coercive force ratio $Hc/Hc_0$ thereof, obtained by normalization of the coercive force Hc by the dynamic coercive force $Hc_0$, were determined. The results are shown in Table 1. The determination of the dynamic coercive force $Hc_0$ was carried out by measuring the variation of Hc as observed when the rate of magnetic field imposition was varied, and by fitting the measured value to the Sharrock's formula.

As seen from Table 1, the average particle diameters <D> of crystal grains in the magnetic layers were in the range of approximately 6 to 7 nm and the standard deviation σ/<D> thereof was smaller than 0.2 in the examples of the invention. In contrast, <D> in Comparative Example 1 was approximately the same as those in the examples of the invention, but σ/<D> was 0.27, i.e., very large, in Comparative Example 1. These experimental data show that the dispersion of particle diameters in the magnetic recording medium of the present invention is smaller than that in the magnetic recording medium of the comparative example.

The coercive force ratios $Hc/Hc_0$ in the magnetic recording mediums of the present invention were larger than 0.3. In contrast, $Hc/Hc_0$ in the magnetic recording medium of the comparative example was 0.22, i.e., very small as compared with those of the present invention. In general, the $Hc/Hc_0$ is inverse proportion is inversely proportional to the exchange coupling between magnetic crystal grains. The larger the $Hc/Hc_0$, the smaller the exchange coupling.

The above-stated experimental results show that the addition into the MgO-containing underlayer of the element having the prescribed free energy for oxidation enables the rendering uniform in size of magnetic crystal grains in the magnetic layer, as well as the weakening of the exchange coupling between magnetic crystal grains. It is considered that these benefits are brought due to the fact that crystal grains in the MgO-containing layer having the prescribed element added therein have a grain size smaller than those of the MgO-containing layer not having the prescribed element; and that most magnetic crystal grains exhibit one-by-one growth on the crystal grains in the prescribed element-added MgO-containing layer.

TABLE 1

| Examples | Composition of MgO-Containing Underlayer | <D> (nm) | σ/<D> | $Hc/Hc_0$ |
| --- | --- | --- | --- | --- |
| 1-1 | MgO-12 at % Al | 6.2 | 0.18 | 0.32 |
| 1-2 | MgO-8 at % Si | 6.5 | 0.17 | 0.31 |
| 1-3 | MgO-20 at % Ti | 6.6 | 0.19 | 0.35 |
| 1-4 | MgO-15 at % V | 6.1 | 0.18 | 0.33 |
| 1-5 | MgO-6 at % Cr | 6.0 | 0.17 | 0.34 |
| 1-6 | MgO-9 at % Mn | 6.8 | 0.18 | 0.32 |
| 1-7 | MgO-16 at % Zr | 6.6 | 0.19 | 0.31 |
| 1-8 | MgO-9 at % B | 6.5 | 0.18 | 0.33 |
| Comp. Ex. 1 | MgO | 6.4 | 0.27 | 0.22 |

Note,
<D>: Average particle diameter
σ/<D>: Standard deviation
$Hc/Hc_0$: Coercive force ratio Examples 2-1 to 2-10, and Comparative Example 2

Thermally assisted magnetic recording media having a multilayer structure as illustrated in FIG. 2 were manufactured as follows.

A Ag heat sink layer (202) having a thickness of 100 nm, an Fe-10 atomic % Ta-12 atomic % C alloy soft magnetic underlayer (203) having a thickness of 100 nm and a Ta underlayer (204) having a thickness of 10 nm were formed in this order on a glass substrate (201). Then a MgO-containing underlayer (205) having a thickness of 3 nmm was formed, and then the substrate was heated to 420° C. Thereafter, (Fe-50 atomic % Pt)-45 atomic % C magnetic layer (206) having a thickness of 10 nm, Co-10 atomic % Ta-5 atomic % Zr cap layer (207) having a thickness of 2 nm and then a DLC protective overcoat (208) having a thickness of 3 nm were formed in this order.

As the MgO-containing underlayer (205), each of the following compositions: MgO-6 atomic % Al-3 atomic % Si, MgO-10 atomic % Si-5 atomic % Cr, MgO-5 atomic % Si-5 atomic % Zr, MgO-12 atomic % Ti-2 atomic % Cr, MgO-20 atomic % Ti-2 atomic % Zr, MgO-15 atomic % V-2 atomic % Cr, MgO-5 atomic % Cr-2 atomic % Mn, MgO-8 atomic % Cr-5 atomic % Zr, MgO-20 atomic % Zr-2 atomic % Si, and MgO-6 atomic % B-3 atomic % Si were used, respectively, in Examples 2-1 to 2-10. For comparison, an MgO underlayer to which an element having the prescribed free energy for oxidation had not been added was used in Comparative Example 2.

An average particle diameter <D> of magnetic crystal grains of the magnetic layer in each of the magnetic recording mediums in Examples 2-1 to 2-10 and Comparative Example 2, a standard deviation thereof normalized by the average particle diameter, σ<ID>, and a cluster size Dn thereof were determined. The average particle diameters of magnetic crystal grains in the magnetic layers were measured by observation of plane-view TEM images of the magnetic layers. The cluster sizes were measured at room temperature by the method described in IEEE Trans. Magn., vol. 27, pp 4975-4977, 1991. More specifically the cluster sizes Dn were calculated from the formula:

$$Dn = tmag \times \sqrt{Nd}$$

wherein Nd is demagnetization factor determined from a minor loop analysis, and tmag is thickness of a magnetic layer film.

As seen from Table 2, the average particle diameters <D> of magnetic crystal grains in the magnetic layers were in the range of approximately 5 to 6 nm in the examples of the invention and the comparative example. The standard deviations σ/<D> of the average particle diameters were smaller than 0.2 in the examples of the invention. In contrast, σ/<D> in Comparative Example 2 was 0.32, i.e., very large. The cluster sizes Dn of crystal grains in the magnetic layers were in the range of approximately 40 to 60 nm in the examples of the invention. In contrast Dn in Comparative Example 1 was 88 nm, i.e., very large.

These experimental results show that the dispersion of particle diameters of magnetic crystal grains can be rendered small and concurrently the size of clusters can be drastically reduced in the magnetic recording medium of the present invention by the addition of at least one element selected from Al, Si, Ti, V, Cr, Mn and Zr into the MgO-containing magnetic layer.

TABLE 2

| Examples | Underlayer | <D> (nm) | σ/<D> | Dn (nm) |
|---|---|---|---|---|
| 2-1 | MgO-6 at % Al-3 at % Si | 5.2 | 0.18 | 45 |
| 2-2 | MgO-10 at % Si-5 at % Cr | 5.5 | 0.17 | 52 |
| 2-3 | MgO-5 at % Si-5 at % Zr | 5.6 | 0.19 | 51 |
| 2-4 | MgO-12 at % Ti-2 at % Cr | 5.3 | 0.18 | 49 |
| 2-5 | MgO-20 at % Ti-2 at % Zr | 5.1 | 0.19 | 55 |
| 2-6 | MgO-15 at % V-2 at % Cr | 5.4 | 0.17 | 48 |
| 2-7 | MgO-5 at % Cr-2 at % Mn | 5.7 | 0.16 | 58 |
| 2-8 | MgO-8 at % Cr-5 at % Zr | 5.6 | 0.18 | 53 |
| 2-9 | MgO-20 at % Zr-2 at % Si | 5.5 | 0.19 | 48 |
| 2-10 | MgO-6 at % B-3 at % Si | 5.4 | 0.17 | 42 |
| Comp. Ex. 2 | MgO | 5.6 | 0.32 | 88 |

Note,
<D>: Average particle diameter
σ/<D>: Standard deviation
Dn: Cluster size (=tmag × √Nd)

Example 3

Each of the thermally assisted magnetic recording mediums manufactured in Examples 1-1 to 1-8 and 2-1 to 2-10 was coated with a perfluoropolyether lubricant. Using each lubricant-coated magnetic recording medium, a magnetic recording storage having a structure as illustrated in FIG. 3 was manufactured. The magnetic recording storage had, in combination: the thermally assisted magnetic recording medium (301); a driving part (302) for rotating the thermally assisted magnetic recording medium (301); a magnetic head (303) comprising a recording head part and a reproducing head part; means (304) for moving the magnetic head to the thermally assisted magnetic recording medium; and a recording-and-reproducing signal treating means (305) for inputting signal to the magnetic head and for reproducing output signal from the magnetic head.

The magnetic head (FIG. 3, 303) had a constitution as illustrated in FIG. 4. The magnetic head is comprised of a recording head part (401) and a reproducing head part (411).

The recording head part (401) had an upper pole (402), a lower pole (403), and a PSIM (planar solid immersion mirror) (404) sandwiched between the upper pole (402) and the lower pole (403). The PSIM (404) had an evanescent light-emitting means (405) provided at the tip of the PSIM (404). The PSIM (404) constitute a waveguide for guiding laser from the laser-emitting means (407) to the evanescent light-emitting means (405). The PSIM has a grating part (406) which is irradiated with semi-conductor laser (408) having a wavelength of 650 nm emitted from the laser-emitting means (407). The laser is concentrated to the evanescent light-emitting means (405), and the emitted evanescent light (409) heats the thermally assisted magnetic recording medium (410).

The reproducing head part (411) of the magnetic head has a upper shield (412), a lower shield (413), and a TMR element (414) sandwiched between the upper shield (412) and the lower shield (413).

Using the above-mentioned magnetic head, each of the magnetic recording mediums manufactured in the examples of the invention was heated, and recording was made at a linear recording density of 1200 kFCI (kilo flux changes per inch) whereby the electromagnetic conversion characteristics were evaluated. High SN ratios of at least 15 dB and good writing over characteristics were obtained on all of the magnetic recording mediums of the invention.

Example 4

Thermally assisted magnetic recording media having the same multilayer structure as described in Example 2-1 were manufactured wherein MgO-containing underlayers having Si added therein were used instead of the MgO-6 atomic % Al-3 atomic % Si underlayer. The content of Si in the MgO-containing layer was varied in a range of 1 atomic % to 50 atomic %.

Figure 5:
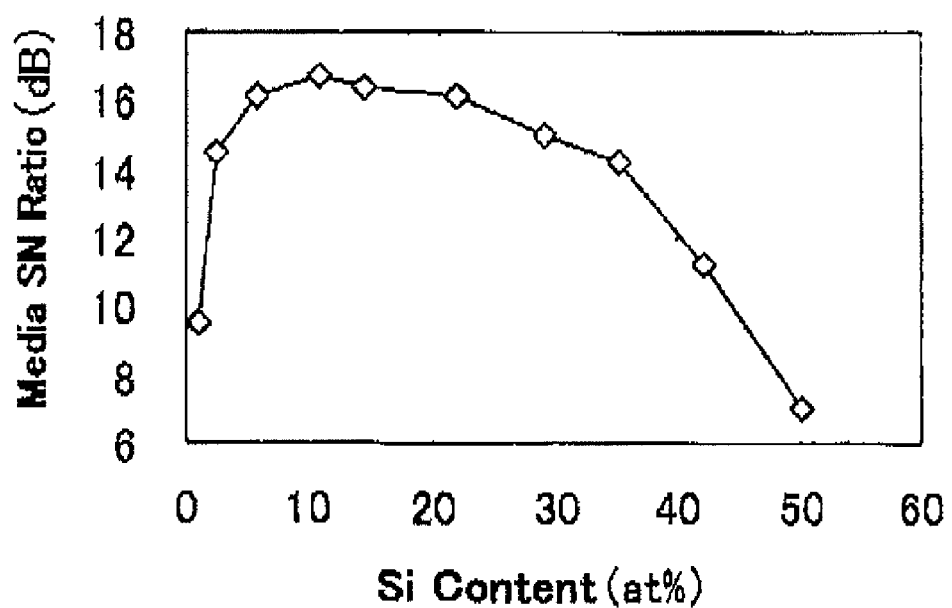
FIG. 5 is a graph showing a correlation between the content of Si in the MgO-containing underlayer and the media SN ratio.

The media SN ratio was measured using the same magnetic head as used in Example 3. A correlation between the content of Si in the MgO-containing underlayer and the media SN ratio as illustrated in the graph in FIG. 5 was obtained.

When the Si content was 1 atomic %, the media SN ratio was smaller than 10 dB, but, when the Si content was 2.5 atomic %, the media SN ratio was drastically increased to 14.5 dB. When the Si content was 1 atomic %, the cluster size Dn was undesirably large, i.e., 92 nm. The small media SN ratio of 10 dB is presumed to be due to the undesirably large cluster size.

When the Si content was further increased, the media SN ratio reached the maximum value at a Si content of approximately 11. At a higher Si content, the media SN ratio gradually decreased, but was maintained at a high value until the Si content was increased to approximately 40 atomic %. When the Si content exceeded approximately 40 atomic %, the media SN ratio drastically decreased. The decrease of the media SN ratio is presumed to be due to the deterioration of the NaCl structure in the MgO-containing underlayer at such a high Si content.

Thus it is seen that, when the Si content is in the range of approximately 2 atomic % to approximately 40 atomic %, the heat assisted magnetic recording medium has a satisfactory media SN ratio. Especially satisfactory media SN ratio is obtained at a Si content in the range of approximately 5 atomic % to approximately 25 atomic %.

The invention claimed is:

1. A thermally assisted magnetic recording medium comprising a substrate, a plurality of underlayers formed on the substrate, and a magnetic layer which is formed on the underlayers and predominantly comprised of an alloy having an $L1_0$ structure, characterized in that at least one of said underlayers is predominantly comprised of MgO and comprises at least one kind of an element having a free energy for oxidation of, per mol of oxygen, not higher than $-120$ kcal/mol·$O_2$ at 1000° C.

2. The thermally assisted magnetic recording medium according to claim 1, wherein the element having a free energy for oxidation of, per mol of oxygen, not higher than $-120$ kcal/mol·$O_2$ at 1000° C. is at least one element selected from the group consisting of Al, Si, Ti, V, Cr, Mn, Zr and B.

3. The thermally assisted magnetic recording medium according to claim 1, wherein the content of the element having a free energy for oxidation of, per mol of oxygen, not higher than $-120$ kcal/mol·$O_2$ at 1000° C. is in the range of 2 atomic % to 40 atomic %, based on the underlayer predominantly comprised of MgO.

4. The thermally assisted magnetic recording medium according to claim 1, wherein the underlayer predominantly comprised of MgO is formed on an underlayer which is comprised of Cr, or a Cr alloy predominantly comprised of Cr and having a BCC structure.

5. The thermally assisted magnetic recording medium according to claim 1, wherein the underlayer predominantly comprised of MgO is formed on an underlayer which is comprised of Ta.

6. The thermally assisted magnetic recording medium according to claim 1, wherein the underlayer predominantly comprised of MgO has an average particle diameter of smaller than 10 nm.

7. The thermally assisted magnetic recording medium according to claim 1, wherein the magnetic layer is predominantly comprised of an FePt or CoPt alloy having an $L1_0$ structure, and comprises at least one oxide or element, selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO and carbon.

8. The thermally assisted magnetic recording medium according to claim 1, which further comprises a cap layer, formed on the magnetic layer, which is comprised of an alloy having a magneto crystalline anisotropy lower than that of the alloy having an $L1_0$ structure in the magnetic layer.

9. An improved magnetic recording storage comprising, in combination:
   (i) a magnetic recording medium;
   (ii) a driving part for rotating the magnetic recording medium;
   (iii) a magnetic head comprising a recording head part and a reproducing head part; said recording head part having a laser emitting means for heating the magnetic recording medium, a waveguide for guiding laser from the laser-emitting means to a tip of the recording head part, and an evanescent light-emitting means provided at the tip of the recording head part;
   (iv) means for moving the magnetic head to the magnetic recording medium; and
   (v) a recording-and-reproducing signal treating means for inputting signal to the magnetic head and for reproducing output signal from the magnetic head;
   wherein the improvement lies in that the magnetic recording medium is a thermally assisted magnetic recording medium as claimed in claim 1.

* * * * *